United States Patent
Stoyanov

(10) Patent No.: US 11,719,114 B2
(45) Date of Patent: Aug. 8, 2023

(54) LOW FRICTION CARBON—CARBON SEAL ASSEMBLY

(71) Applicant: United Technologies Corporation, Farmington, CT (US)

(72) Inventor: Pantcho P. Stoyanov, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 314 days.

(21) Appl. No.: 16/574,586

(22) Filed: Sep. 18, 2019

(65) Prior Publication Data
US 2021/0062665 A1  Mar. 4, 2021

Related U.S. Application Data

(60) Provisional application No. 62/733,598, filed on Sep. 19, 2018.

(51) Int. Cl.
| | | |
|---|---|---|
| *F16J 15/16* | (2006.01) | |
| *F01D 11/00* | (2006.01) | |
| *F16J 15/3284* | (2016.01) | |

(52) U.S. Cl.
CPC ......... *F01D 11/003* (2013.01); *F16J 15/3284* (2013.01); *F05D 2240/55* (2013.01); *F05D 2300/224* (2013.01); *F05D 2300/50* (2013.01)

(58) Field of Classification Search
CPC ...... F16J 15/3284; F16J 15/34; F16J 15/3404; F01D 11/003; F05D 2240/55; F05D 2300/224; F05D 2300/50
See application file for complete search history.

(56) References Cited

U.S. PATENT DOCUMENTS

| | | | | |
|---|---|---|---|---|
| 3,804,648 A | * | 4/1974 | Birchall | G21C 5/126 501/100 |
| 4,336,944 A | | 6/1982 | Blair | |
| 5,042,824 A | * | 8/1991 | Gardner | F16J 15/3468 277/399 |
| 2009/0277197 A1 | * | 11/2009 | Gambiana | F25B 39/028 62/115 |
| 2014/0319776 A1 | * | 10/2014 | Theike | F16J 15/3496 277/405 |

(Continued)

FOREIGN PATENT DOCUMENTS

| | | |
|---|---|---|
| EP | 2662601 A1 | 11/2013 |
| EP | 2843270 A1 | 3/2015 |
| EP | 3284980 A1 | 2/2018 |

(Continued)

OTHER PUBLICATIONS http://www.amardeepsteel.com/carbon-seals.html.

(Continued)

*Primary Examiner* — Gilbert Y Lee
(74) *Attorney, Agent, or Firm* — Bachman & LaPointe, P.C.

(57) ABSTRACT

A seal assembly for a gas turbine engine, having a seal formed of a carbon material; and a seal seat positioned for rotation relative to the seal, wherein the seal and the seal seat each have a sealing surface which together define a sliding seal, and wherein at least the sealing surface of the seal seat is made of the same carbon material as the sealing surface of the seal.

9 Claims, 3 Drawing Sheets

(56) References Cited

U.S. PATENT DOCUMENTS

2018/0112711 A1    4/2018   Tadani et al.

FOREIGN PATENT DOCUMENTS

| EP | 3388719 A1 | 10/2018 | |
|---|---|---|---|
| GB | 1407413 A | 9/1975 | |
| JP | 59117957 A | 7/1984 | |
| WO | WO-2009107440 A1 * | 9/2009 | ............. F16J 15/006 |

OTHER PUBLICATIONS

European Search Report dated Feb. 14, 2020 issued for corresponding European Patent Applications No. 19198453.3.
European office action for patent application No. 19 198 453.3-1015 dated Dec. 15, 2020.

* cited by examiner

LOW FRICTION CARBON—CARBON SEAL ASSEMBLY

CROSS-REFERENCE TO RELATED APPLICATION

Benefit is claimed of U.S. Patent Application No. 62/733,598, filed Sep. 19, 2018, and entitled "LOW FRICTION CARBON—CARBON SEAL ASSEMBLY", the disclosure of which is incorporated by reference herein in its entirety as if set forth at length.

BACKGROUND

The disclosure relates to a seal assembly, and more particularly to a bearing seal for a gas turbine engine.

Gas turbine engines have rotating elements mounted within stationary components at bearings which must be sealed to prevent escape of oil. Such seals are known as bearing seals or oil seals. One form of seal for such purpose is a carbon seal, where a carbon material seal is closely positioned around or relative to a rotating element. When first operated, such a seal results in the transfer of carbon from the carbon seal to the rotating element or seat of the seal assembly to form a film of carbon on the seat. This film is intended to have a low coefficient of friction with the seal, such that escape of oil between the seal and seat is prevented while operating at an acceptably low coefficient of friction.

This period of operation, when the film is formed, is referred to as the break-in phase of the seal. During break-in, excessive friction can be created, resulting in potential excessive wear on parts of the seal, excessive heat at locations of the seal or seat, and other issues. This issue is all the more serious in seals which are to operate at high velocity and relatively low pressure, which can increase the already high temperature due to friction. The present disclosure addresses this issue.

SUMMARY

In accordance with the present disclosure, there is provided a seal assembly for a gas turbine engine, comprising a seal comprising a carbon material; and a seal seat positioned for rotation relative to the seal, wherein the seal and the seal seat each have a sealing surface which together define a sliding seal, and wherein at least the sealing surface of the seal seat is made of the same carbon material as the sealing surface of the seal.

In a another non-limiting embodiment, the seal seat has a recessed area, and a carbon-based block mounted in the recess, the carbon-based block defining the sealing surface of the seal seat. In still another non-limiting embodiment, the seal seat itself comprises carbon-based material matching the seal.

In a further non-limiting embodiment, the sealing surfaces of the seal and the seal seat are the same material selected from the group consisting of electrographitic grade carbon, carbon-graphite grade carbon, and combinations thereof.

In a still further non-limiting embodiment, the sealing surfaces of the seal and the seal seat define a coefficient of friction of less than 0.1.

Other details of the disclosed seal assembly are set forth in the following detailed description and the accompanying drawings wherein like reference numerals depict like elements.

DETAILED DESCRIPTION

The disclosure relates to a seal assembly for a gas turbine engine and, more particularly, to a carbon seal assembly for the oil seals of a gas turbine engine.

Figure 1:
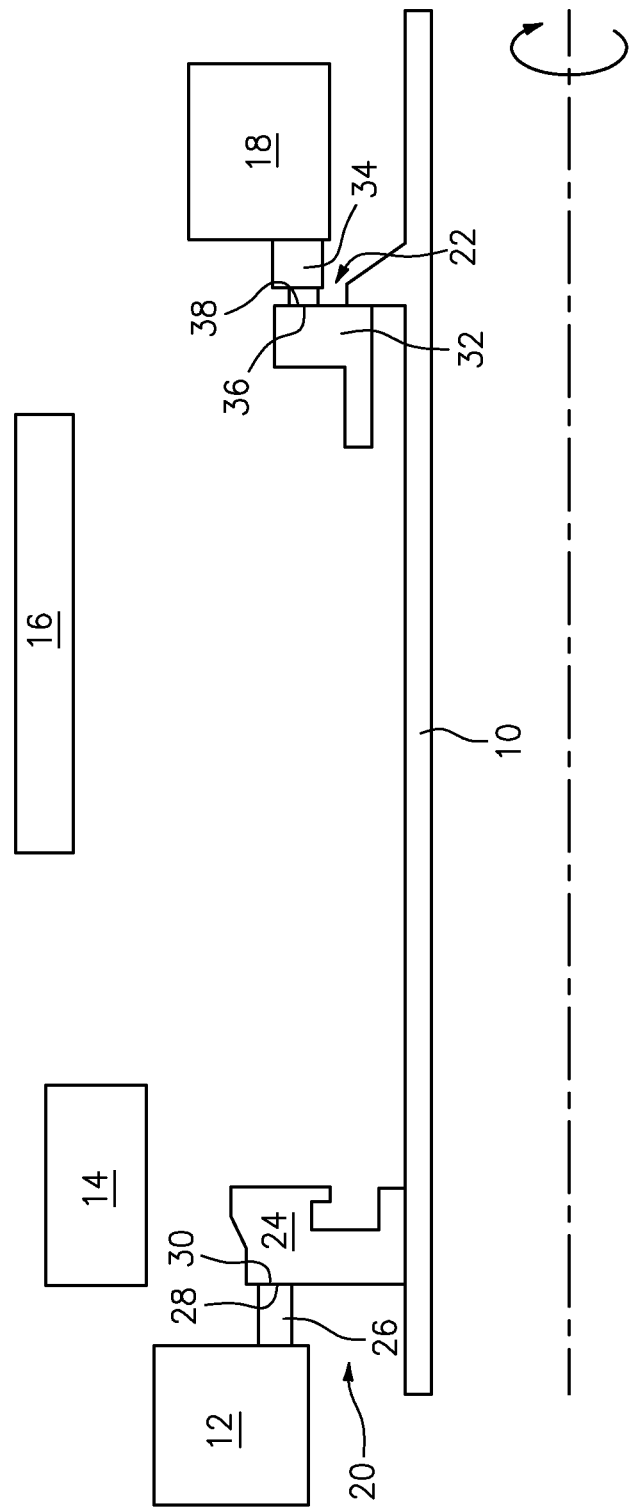
FIG. 1 illustrates a simplified cross-sectional view of a portion of a gas turbine engine.

FIG. 1 is a cross-sectional illustration of a portion of a gas turbine engine, and illustrates typical components of such an engine. Of interest to the present disclosure is a rotational shaft 10 to which are coupled various operative components of the engine, and stationary structures 12, 14, 16, 18 which cooperate with structure 10 to perform desired functions. Other features of the engine have been removed from the view of FIG. 1, or reduced to simple schematic illustration, to allow focus on features which are pertinent to the present disclosure.

In such a setting, FIG. 1 illustrates a front seal assembly 20 and a rear seal assembly 22, each of which serves to prevent leakage or flow of oil past the seal, and thereby maintain oil where desired and needed in the gas turbine engine.

Seal assembly 20 is defined by a front seal seat 24 and a carbon seal 26. Carbon seal 26 remains stationary relative to rotating element 10 and seal seat 24. As shown in FIG. 1, each of these components has a sealing surface 28, 30, which together define the seal. These surfaces 28, 30 slide relative to each other and prevent leakage of oil through these surfaces. Similarly, seal assembly 22 is defined by a rear seal seat 32 and a carbon seal assembly 34, each of which defines sealing surfaces 36, 38 to prevent leakage of oil through these surfaces.

Figure 2:
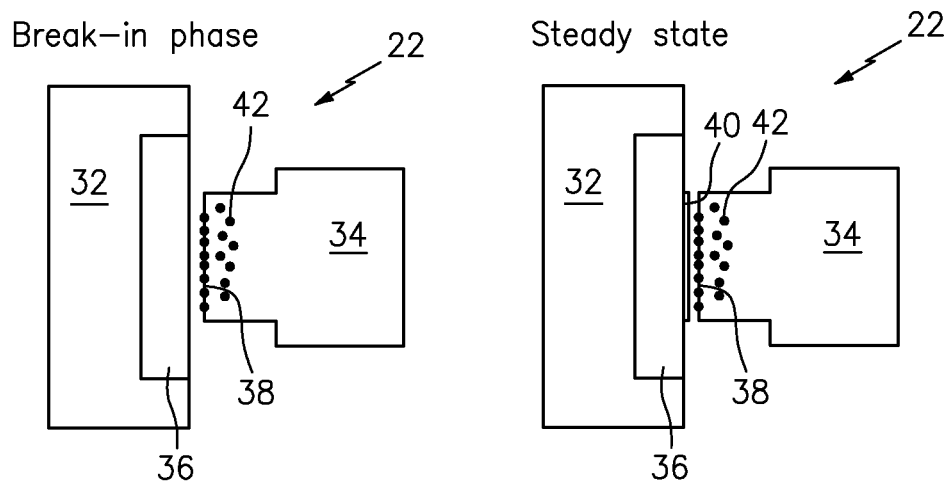
FIG. 2 illustrates a simplified cross-sectional view of a prior art seal assembly for a gas turbine engine.
Figure 3:
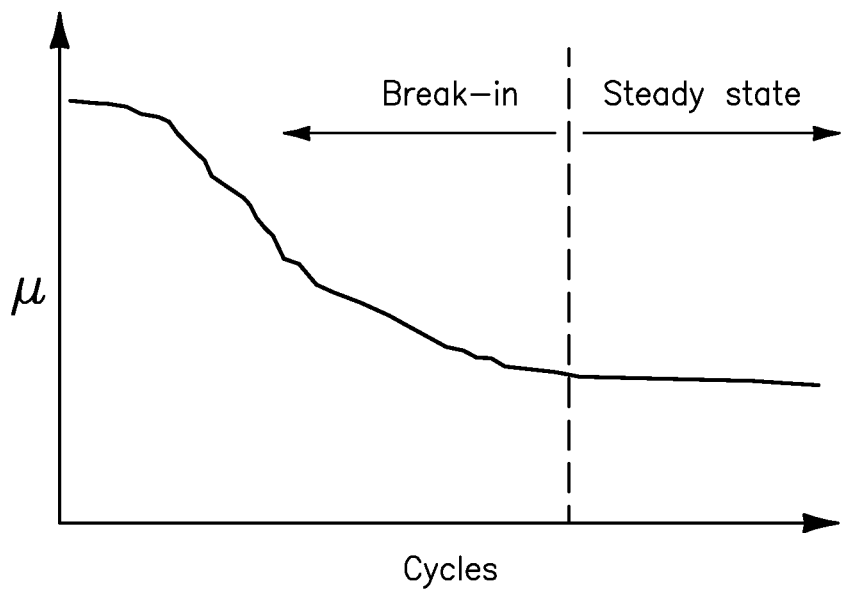
FIG. 3 illustrates coefficient of friction for the seal assembly of FIG. 2 during break-in and then steady state operation.

FIG. 2 illustrates portions of a carbon seal 34 and seal seat 32, including surfaces 36, 38. Seal seat 32 in this known configuration is typically formed of a material such as an Fe-based alloy such as AMS 6490/6491, AMS 6322, or AMS 6323, which may or may not have an additional material applied to it such as a PWA50 material. In any event, the material of the seal seat starts with a relatively high coefficient of friction with respect to the carbon seal, and this continues until a break-in phase is completed. As shown, carbon seal 34 is positioned adjacent to an untreated seal seat 36, and initial operation of this seal assembly results in the break-in phase wherein a coefficient of friction between the surfaces, as shown in FIG. 3, starts relatively high and gradually decreases. The image shown in the right hand portion of FIG. 2 shows seal assembly 22 after the break-in phase. At this stage, a thin transfer film 40 has been transferred from carbon seal 34 to sealing surface 36 of seal seat 32. Once this film 40 is transferred to surface 36, seal assembly 22 operates in steady state conditions for the remainder of life of the seal assembly, and FIG. 3 shows this portion of the operation of seal assembly having a relatively lower coefficient of friction than was present during the break-in phase.

FIG. 2 shows carbon seal 34 having film controllers 42 which can be provided in carbon seal 34. These film controllers 42 serve to prevent excessive build up of thickness of the transfer film 40, thereby maintaining the desired carbon-carbon sliding surfaces defined by carbon seal 34 on one side and the transfer film 40 on the other.

Figure 4:
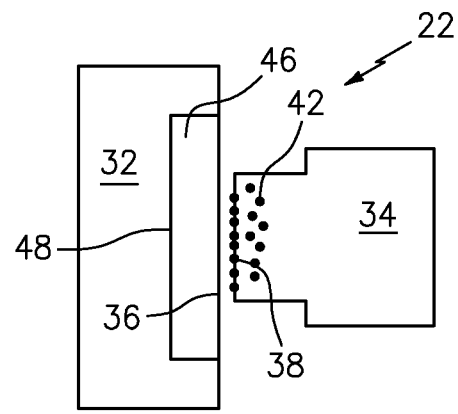
FIG. 4 illustrates a simplified cross-sectional view of a seal assembly for a gas turbine engine as disclosed herein.
Figure 5:
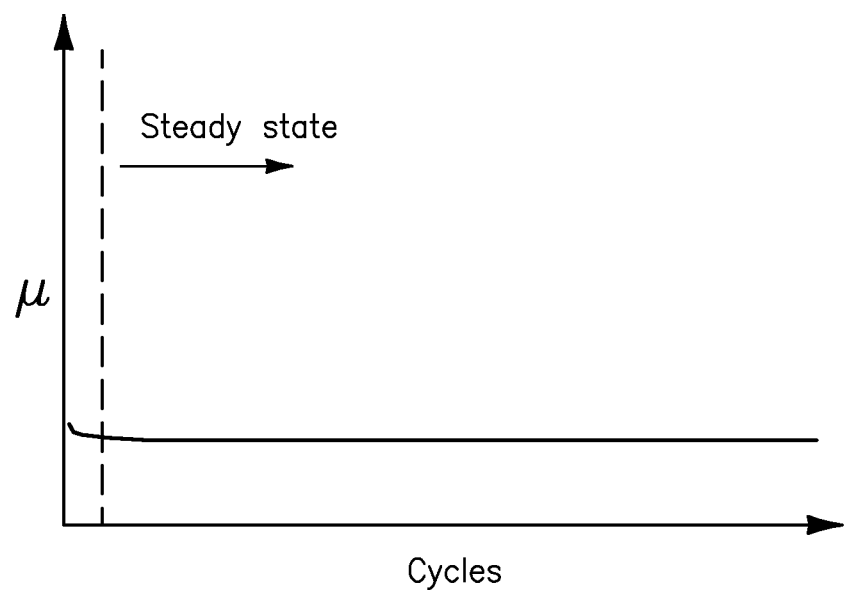
FIG. 5 illustrates coefficient of friction for the seal of FIG. 4 with no break-in phase due to the materials of seal and seal seat, and steady state operation.

FIGS. 4 and 5 together show a seal assembly wherein the seal seat is prepared including at least a sealing surface 36 of the same or similar carbon-based material from which the seal is made. Thus, sealing surfaces 36, 38 are made of similar carbon-based materials and have a very low coefficient of friction from initial contact through the entire lifetime of the seal assembly. During steady state operation, a transfer film 44 is still applied over surface 36 of the seal seat. However, this transfer film 44 is of the same material as the seal, and therefore continues to have the desired low coefficient of friction. Thus, as shown in FIG. 5, operation begins substantially immediately in a steady state phase, and continues in such steady state phase for the entire lifetime of the seal assembly.

FIG. 4 shows a block 46 of carbon-based material mounted in the seal seat, for example in a recess or receptacle 48, to coincide with carbon seal 34. Alternatively, the entire seal seat could be prepared from this same material. Thus, when operation of the seal assembly begins, the coefficient of friction is already low due to the carbon-carbon interaction between the carbon seal and carbon seal seat. Steady state operation of this seal assembly results in a transfer film of carbon material being positioned over the carbon-based seal seat, at least to some extent, and this steady state operation leads to extended useful life of the relevant components. This is shown in FIG. 5, wherein steady state operation begins substantially immediately, without a significant break-in phase, and the coefficient of friction at steady state is relatively low as compared to that shown in FIG. 3. During operation of a gas turbine engine having a seal assembly as shown in FIG. 4, a transfer film is still eventually deposited from carbon seal 34 over DLC thin film 44, and the thickness of this transfer film is also controlled, for example by film controllers 42 which can also be present in carbon seal 34 according to this aspect of the disclosure.

Carbon seal 34 can be provided of a suitable electrocarbon such as FT2650, which is an electrographitic grade carbon. The seal seat can typically be provided from the same material. This leads to an initial coefficient of friction, without a break-in phase, of less than 0.1 Alternatively, carbon seal 34 can be provided from a carbon-graphite grade such as P-4229, and this could be run against sealing surfaces of the seal seat made from the same material. This results in an initial coefficient of friction, again without break-in phase, of less than 0.12.

With reference back to FIG. 1, it should be appreciated, that seal 26, 34 can be mounted in a gas turbine engine by being fixed to any suitable structure or seal carrier such as structure 12, 18. Further, seal seat 24, 36 can suitably be mounted to rotational member 10 such that sealing surfaces 28, 30, and 36, 38, respectively, are in close sliding proximity to each other when rotational element 10 is rotated.

It should be appreciated that the illustrations of FIGS. 4 and 5 are presented with respect to a rear seal assembly. Illustrations of the same components for a front seal assembly are not provided herein, as the structures would be the same but for being reversed left-to-right.

It should be appreciated that preparation of the seal seat, or at least the sealing surface of seal seat, from a similar carbon-based material as that of the seal, in accordance with the present disclosure, produces a low friction and wear-resistant carbon-based seal interface which, for example, can operate effectively between 200 and 350° F., under elevated sliding velocities. This, in turn, can reduce sub-surface heating (for example due to frictional heating) by reducing the friction co-efficient and improving the break-in phase, which will consequently improve long term wear resistance of the seal system.

Fabricating the seal seat from a carbon-based material to match the seal, as referred to above, creates a carbon-carbon interface with low friction from the beginning of operation, and therefore produces a very short break-in phase. During initial operation, a transferred film is still formed on the seal seat, and this configuration remains through steady state operation of the seal.

It should be appreciated that the low friction and wear resistance produced by the seal assembly as disclosed herein can be useful, for example in bearing seals in gas turbine engines, and in other locations as well, and can significantly increase the endurance life of engine components. Further, utilization of seal assemblies as disclosed herein can significantly reduce overall costs by reducing the number of parts that are stripped prematurely due to wear and thermal damage issues.

There has been provided a seal assembly and method wherein the break-in phase is reduced in length and impact on seal components, and wherein steady state performance of the seal assembly is improved as compared to a seal assembly without the initial pre-filming step. While the seal assembly method and article has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A seal assembly for a gas turbine engine, comprising:
a seal comprising a carbon material; and
a seal seat positioned for rotation relative to the seal, wherein the seal and the seal seat are mounted between a rotational shaft and stationary structure of the gas turbine engine, and each of the seal and the seal seat have a sealing surface which together define a sliding seal, and wherein at least the sealing surface of the seal seat is made of the same carbon material as the sealing surface of the seal, wherein the seal seat has a recessed area, and a carbon-based block mounted in the recess, the carbon-based block defining the sealing surface of the seal seat, and wherein the sealing surfaces of the seal and the seal seat are the same material selected from the group consisting of electrographitic grade carbon, carbon-graphite grade carbon, and combinations thereof.

2. The seal assembly of claim 1, wherein the seal seat comprises carbon-based material matching the seal.

3. The seal assembly of claim 1, wherein the sealing surfaces of the seal and the seal seat define a coefficient of friction of less than 0.1.

4. The seal assembly of claim 1, wherein the sealing surfaces of the seal and the seal seat are the same electrographitic grade carbon.

5. The seal assembly of claim 1, wherein the sealing surfaces define an oil seal between the rotational shaft and the stationary structure of the gas turbine engine.

6. The seal assembly of claim 1, further comprising film controllers in the seal to control formation of transfer film on the seal seat.

7. The seal assembly of claim 1, wherein the seal and the seal seat can be moved relative to each other with no break-in phase.

8. The seal assembly of claim 1, wherein the sealing surface of the seal and the sealing surface of the seal seat are flat radial surfaces with respect to an axis of rotation of the gas turbine engine.

9. The seal assembly of claim 8, wherein the sliding seal is defined along a single contact plane of the sealing surface of the seal seat and the sealing surface of the seal.

* * * * *